United States Patent
Bobard

[15] 3,693,332
[45] Sept. 26, 1972

[54] SELF-PROPELLED MACHINES FOR FARMING AND ANALOGOUS PURPOSES

[72] Inventor: Emile Bobard, 17 rue de Reon, Beaune, Cote D'Or, France

[22] Filed: March 4, 1970

[21] Appl. No.: 16,372

Related U.S. Application Data

[63] Continuation-in-part of Ser. No. 709,756, March 1, 1968, abandoned.

[52] U.S. Cl. ........................................ 56/15.6, 56/2
[51] Int. Cl. ................................................ A01d 41/02
[58] Field of Search .................................... 56/15.6

[56] References Cited

UNITED STATES PATENTS

| | | | |
|---|---|---|---|
| 2,936,562 | 5/1960 | Sawyer | 56/15.6 |
| 3,412,534 | 11/1968 | Teale | 56/15.6 UX |
| 2,488,698 | 11/1949 | Acton | 56/15.6 |
| 2,867,958 | 1/1959 | Allen | 56/15.6 UX |
| 2,592,866 | 4/1952 | Coultas et al. | 56/15.6 X |
| 3,520,118 | 7/1970 | Halls et al. | 56/15.6 X |

Primary Examiner—Louis G. Mancene
Assistant Examiner—D. L. Weinhold
Attorney—Wilkinson, Mawhinney and Theibault

[57] ABSTRACT

The disclosure of the present invention is a self-propelled composite machine for harvesting cereals, resulting from the incorporation of a harvesting and threshing implement or the like to a self-propelled vehicle having a straddle-type frame and including various harvesting implements permitting of successively farming machines of the type of the composite self-propelled machine. By "incorporation" is here meant a coupled condition of the tractor and implements, such that the implement is directly supported by the tractor, rather than being coupled thereto in trailing relation, so that in such composite machines the implement frame may be, and in fact generally is, entirely wheel-less.

7 Claims, 12 Drawing Figures

SELF-PROPELLED MACHINES FOR FARMING AND ANALOGOUS PURPOSES

The invention is a continuation-in-part of application Ser. No. 709,756 now abandoned.

The invention concerns a self-propelled composite machine for harvesting cereals, resulting from the incorporation of a harvesting and threshing implement or the like to a self-propelled vehicle having a straddle-type frame.

The invention likewise concerns a self-propelled vehicle having a straddle frame and harvesting implements permitting of successively forming machines of the type of the composite self-propelled machine mentioned above. By "incorporation" is here meant a coupled condition of the tractor and implements, such that the implement is directly supported by the tractor, rather than being coupled thereto in trailing relation, so that in such composite machines the implement frame may be, and in fact generally is, entirely wheel-less.

Already known is a self-propelled harvester-thresher resulting from the incorporation of a harvesting and threshing implement to a self-propelled vehicle having a frame of the type shaped as a reversed "U" (see German Patent No. 1,069,416 WEHSELY).

The frame of such a vehicle comprises, in fact, four legs equipped with wheels at their lower ends and assembled, two by two, in an inclined position, at their tops, to the ends of a cross-member in order to form two lateral supports of said cross-member, the harvester-thresher implement frame, placed beneath the cross-member and between these supports, being secured laterally to the legs of these supports to ensure the formation of longitudinal and transverse struts for the middle or lower parts of the legs.

Now in order to form such a self-propelled machine, the matching up of the parts of the implement frame and of the parts of the vehicle to be secured together is inevitably a slow and delicate operation, which is incompatible with the convenience and rapidity needed for successive incorporations of implements for tasks which are necessarily carried out one after the other, for example in agriculture.

Further, the legs of the vehicle are assembled to the cross-member only by hinges and these frame elements are devised so as to be adjusted lengthwise in order to adapt the dimensions of the vehicle frame to the dimensions of the implements which may be incorporated thereto, and notably to their height, in such a way that this frame structure, to be rigid, needs bulky and complex elements which are consequently heavy and costly.

Certainly also known are frame vehicles comprising two side frames spaced transversely in the shape of a "U" either reversed or sideways, which can be rapidly and conveniently coupled to a load with a view to transporting the latter. (See U.S. Pats. No. 2,529,749 WADE et al., and 3,387,726 McKee et al.).

The frames of these vehicles are in fact equipped with load-lifting mechanisms secured between the free parts of their side frames but they do not permit an acceptable formation of composite self-propelled machines of the type mentioned above because said mechanisms do not enable the load to form part of the transverse bracing of the free parts of the two side frames. Moreover, for suitable rigidity of a frame of this type whereof large parts of the two side frames are independent of one another, the elements which constitute it are abviously adapted to the size of the loads which it must carry, implying bulky elements and, as a result, a costly frame.

The invention proposes to overcome these drawbacks.

A first object of the invention is to propose a composite self-propelled machine resulting from the combination of a self-propelled vehicle having a straddle frame which is relatively inexpensive but light and rigid, and a harvester-thresher implement.

A second object of the invention is to propose a composite self-propelled machine of the type mentioned above, including a harvesting and threshing implement of the like having a rigid frame.

A third object of the invention is to equip the two side frames of the frame of a vehicle of the above type with means permitting, after straddling of one portion of an implement, rapid and convenient coupling and uncoupling of this implement from said frame.

A fourth object of the invention is to propose, for a vehicle of the above type, a frame having two side frames equipped with coupling means ensuring firm bracing of the low parts of these two side frames, both longitudinally and transversely, thanks to the coupled structure of an implement.

A fifth object of the invention is to propose, for a vehicle of the above type, a frame having two side frames equipped with coupling elements offering large lateral tolerances of the relative positions of the side frames of the frame and of an implement with a view to facilitating the coupling of the latter.

A sixth object of the invention is to propose improvements to certain implements intended to be coupled to a vehicle of the above type, in order to form large self-propelled agricultural machines, such as harvester-threshers or corn harvester-reapers; these improvements permitting reduction of the height of the vehicle intended to be coupled thereto.

A seventh object of the invention is to propose improvements to certain implements intended to be coupled to a vehicle of the above type, these improvements permitting a simplified utilization of the self-propelled machine thus formed.

Other objects and advantages of the invention will be made apparent from the following description taken in connection with the accompanying drawings, which description and drawings are given only by way of non-limitative example.

Figures 1, 5:
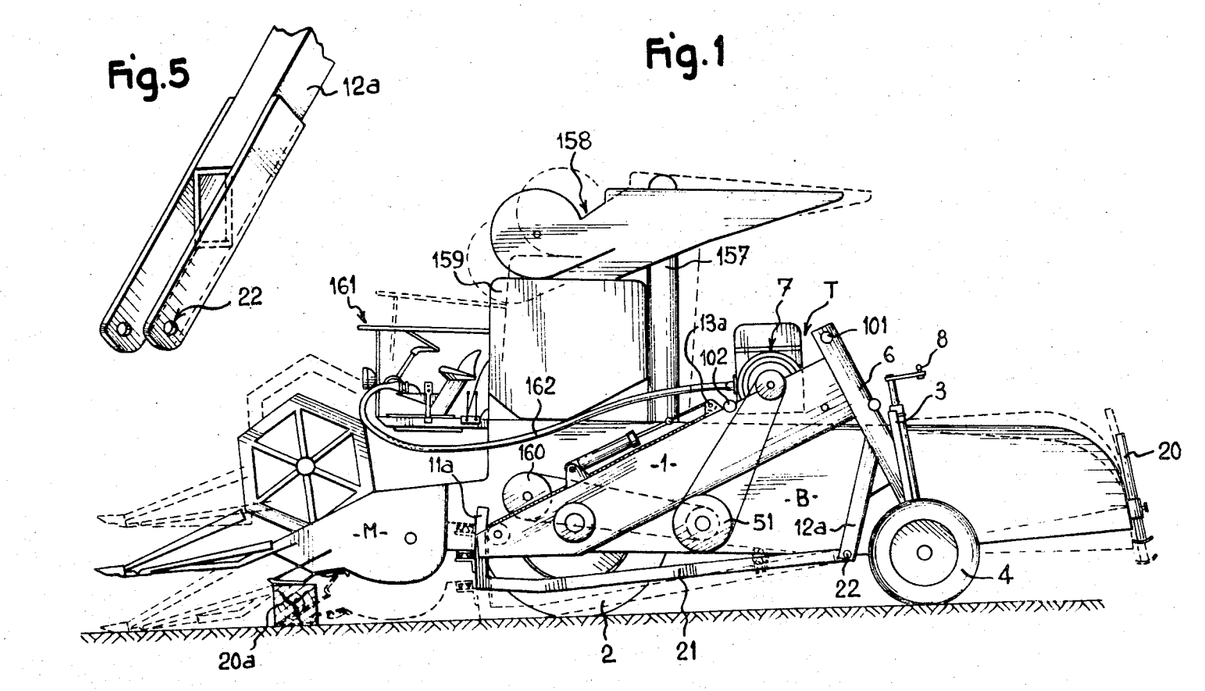
FIG. 1 shows in side elevation a self-propelled harvester-thresher according to the invention.
FIG. 5 shows in perspective and with partial cutaway, on an enlarged scale, an element of the tractor of FIGS. 2 to 4.

Illustrated in FIG. 1 is a harvester-thresher machine comprising in combination a tractor unit T according to the invention having incorporated therewith a harvester-thresher implement including a harvesting section M and a thresher section B.

Figure 2:
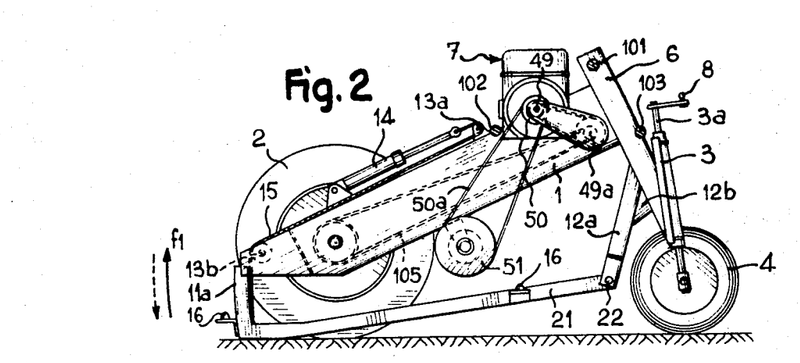
FIG. 2 shows in side elevation a tractor permitting the formation of the self-propelled harvester-thresher of FIG. 1.

The tractor (see FIGS. 2 to 4) has a frame including a pair of side frames, similar to each other. Each side frame has the shape of a reversed "V" including legs 1 and 6 inclined in different directions. For each side an upright 3 is rigidly fixed at its base to the lower end of the leg 6, as shown in FIG. 2. These elements 1, 6 and 3 are tubular. A driving wheel 2 is rotatably supported by means of suitable axles at the base of the leg 1 which has the larger dimensioned cross-section of the two legs.

Figure 3:
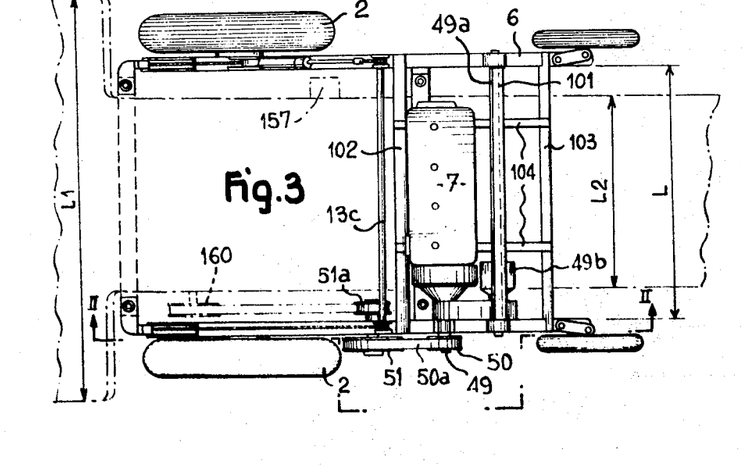
FIGS. 3 and 4 show respectively in plan and in transverse elevation seen from behind, the tractor of FIG. 2.
Figure 4:
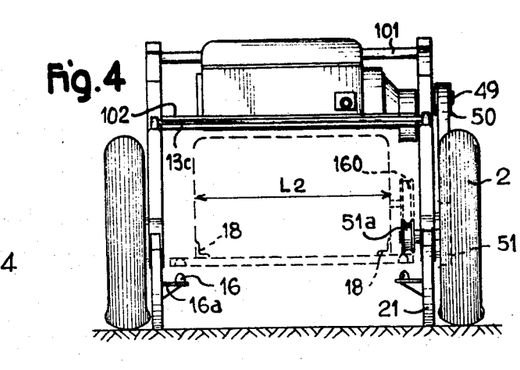

A steering shaft 3a is pivotally mounted inside each upright 3. A steering wheel 4 is suitably mounted rotatably at the lower end of this shaft. The upper ends of said shafts 3a of the two side frames are connected by connecting rod bearings designated by the general reference 8, to conventional steering mechanisms to communicate steering movements to the wheels 4.

Three bars 101, 102, 103, of the same length, are arranged transversely to the two side frames in parallel triangular configuration and have their ends firmly secured to the upper parts of the legs 1 and 6 of these side frames.

The bars 102, 103 are placed at substantially the same level underneath bar 101 and two sectional members 104 identical to each other are mounted perpendicularly on said bars 102, 103 to form a platform disposed at a relatively high level, between the two side frames, and on said platform is secured an engine transmission unit designated by the general reference 7.

The structure formed by bar 101 and the two bars 102, 103 assembled by means of the sectional elements 104 ensures a firm bracing of the upper parts of the two side frames described above.

Each of the legs 1 of the driving wheel 2 is constructed in the form of a casing of rectangular transverse section in which is housed a transmission mechanism comprising a chain 105 and sprocket gears (not referenced), which drivingly connect a shaft 49a to each drive wheel 2. This shaft 49a is mounted transversely on the legs 1, practically at the level of the cross-bars 102, 103. This shaft includes two aligned portions, the outer ends of which are mounted on a usual differential device 49b, drivingly connected to the engine transmission unit 7.

A rigid arm 12a, integral with a reinforcing bracket 12b is firmly secured to the lower part of the leg 6 of each side frame; this arm extends downwardly from member 6 at a position to clear the corresponding wheel 4 in all its steering positions.

The lower end of arm 12a (FIG. 5) is formed in the shape of a stirrup piece equipped with a transverse axle 22 and a rigid tubular bar 21, of which one end has a transverse hole, is hinged at this end in said stirrup piece of arm 12a.

The other end of the bar 21 is rigid with the lower end of a guide arm 11a, disposed in the general plane of the side frame; said arm 11a is of rectangular cross-section and is shaped as an arc of a circumference having its center at pivot point 22.

Figure 6:
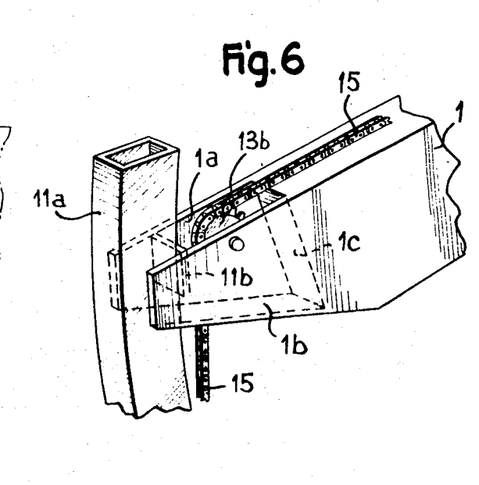
FIG. 6 shows in perspective and with partial cutaway, on an enlarged scale, another element of the tractor of FIGS. 2 to 4.

The length of bar 21 corresponds to the spacing formed between the axis of pivot 22 and the rear part of the leg 1 of the corresponding side frame; the inner lateral wall 1a and the outer lateral wall 1b of each leg 1 are rearwardly extended (FIG. 6) beyond the bottom 1c of said leg. These two walls 1a, 1b, parallel to each other, are partially braced by a slightly curved plate 11b which is applied with slight friction to the concave curved face of arm 11a and the spacing formed between these walls 1a, 1b is slightly larger than the thickness of arm 11a so as to form a rigid stirrup piece, integral with leg 1, for circular sliding movements of arm 11a during pivoting of bar 21 about axis 22.

Up and down movements can be imparted to arm 11a for raising or lowering the rear end of bars 21, thanks to a mechanism including, in each side frame, a chain 15 engaged on guiding pulleys 13b and recall pulleys 13a mounted free on axles mounted respectively on the extensions 1a, 1b of leg 1 and on a stirrup piece rigid with the upper face of said leg 1, the axles of pulleys 13a of the two side frames being placed opposite each other above the level of the bar 102 and being coupled transversely by a shaft 13c shown in FIG. 3.

One end of the chain 15 is connected to the lower part of curved arm 11a and the other end is connected to the piston rod of a jack having a cylinder 14 secured to the upper face of the leg 1.

Conventional means (not shown) for delivery of a pressure fluid to the cylinder 14 are mounted on the frame of the tractor and can be actuated by the engine transmission unit 7.

It will be evident from a consideration of FIGS. 1 and 2 that the pressure fluid, delivered by the conventional means into the upper end of cylinder 14 will actuate the linkage chain 15 and the arm 11a to raise the rear end of bar 21 (arrow $f1$).

Each of the bars 21 has a pair of coupling elements 16 which are respectively fixed on the inner lateral face of the bar 21 and on the convex face of the arm 11a. These two elements are thus spaced along bar 21, as shown in FIGS. 1 and 2.

Figure 8:
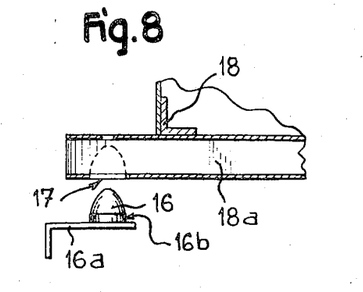
FIG. 8 shows in cross-section and with partial cutaway, on an enlarged scale, elements for coupling the machine of FIG. 7 to the tractor of FIGS. 2 to 4.

Each element 16 (FIGS. 4 and 8) has the general shape of a stud placed vertically, and a semi-oval or ogive contour. The base of the stud has a cylindrical portion 16b and the latter portion is rigidly united with a flange of a right-angled element 16a substantially wider than the base of stud 16 to form a support, the other flange being secured to the inner side of the bar 21 in order to maintain its stud 16 separated from said bar.

Moreover, the engine transmission unit has a transverse shaft 49 (FIGS. 2 to 4), the end of which extends beyond the leg 1 of the right hand side frame of the tractor. This end is equipped with a pulley 50 forming a power takeoff means.

A pulley 51 is mounted on the outer end of a transverse shaft engaged in a bearing which is carried by a pair of tabs integral with the substantially median portion of the lower face of leg 1.

Pulley 51 is aligned with pulley 50 to form, with a belt 50a, a movement-transmission device permitting the driving of a pulley 51a mounted on the inner end of the shaft of pulley 51.

The device MB (best shown in FIG. 7 and shown in a plan diagram in FIG. 3) includes a rigid frame on which are formed a harvesting assembly M and a threshing assembly B.

This frame includes a pair of rigid profile elements 18 (FIG. 8) forming lateral beams disposed in parallel fashion to one another at the base of the apparatus and having a transverse spacing "L" smaller than that between bars 21 of the tractor (FIG. 4).

These profile elements 18 are firmly assembled on tubular cross-bars 18a, 18b, in order to form a floor on the lateral edges of which are formed in a usual manner, side elements (not referenced) bearing a ceiling to form a sort of longitudinal corridor.

The harvesting assembly M comprises:

a conventional straw cutting device 151 disposed on the front edge of a straw-receiving table (not referenced);

a deflector drum 152 suitably mounted above said table. This table which bears the devices 151, 152 is mounted on the front edge of the frame formed on the profile elements 18, 18a and its width "$L_1$" is substantially larger than the width "L" of the tractor described above;

the final device of the assembly M is a simple drum 153 for driving the cut straw, which drum is mounted on the end part of the frame established on profile elements 18. This device 153 is intended to feed the threshing device B and its width "$L_2$" is practically equal to that of said frame and consequently smaller than the width "$L_1$" of cutting device 151 and drum 152.

The threshing assembly B has practically the same width "$L_2$" as that of said frame and includes:

a conventional thresher 154 placed transversely, rearward of the straw driver 153, in the abovementioned corridor;

an ordinary group of straw-shakers 155 extending longitudinally in said corridor, starting from the thresher 154;

a grain-conveying device 156 which includes sections extending longitudinally below thresher 154 and below shakers 155 in order to direct the grain towards a conventional grain elevator 157 placed on one side of the assembly B;

a conventional grain cleaner 158 capable of being supplied by elevator 157;

a hopper 159 placed above thresher 154 and beneath cleaner 158 in order to be supplied directly by the latter; the width of this hopper can be substantially larger than the width "$L_2$" of the frame of assembly B.

It will be noted that the shakers 155 and grain conveyor 156 include usual transverse shafts, tie-rods and eccentrics, not shown, which enable them to be actuated. Further, the devices of the harvesting assembly M and the threshing assembly B can be driven by means of conventional belt and pulley transmissions, one of which 160 (FIG. 1) is connected to pulley 51a of the power takeoff means 49, 50, 51 of the tractor. It will also be noted that the shafts of pulleys 160 and 51 are practically coplanar with the hinge axle 22.

Moreover, cross-bars 18a, 18b form between them a spacing in the longitudinal direction of the assembly B, which spacing is equal to the spacing between the two studs 16 on a bar 21.

Further, these cross-bars 18a, 18b have a width substantially larger than the diameter of the base of a stud 16 and the end part of each cross-bar 18a, 18b has on its lower surface a hole which corresponds to the cross-section of the base of a stud 16.

Finally, the transverse spacing between holes 17 of the cross-bar 18a, or 18b is equal to that of studs 16 of arms 11a or bars 21.

The rear end of assembly B is equipped with a conventional prop 20 capable of being retracted by vertical sliding and when the apparatus MB is uncoupled and put away, as shown in FIG. 2, assembly M is carried by a chock 20a or the like.

The position of the cross-bars 18a, 18b on the profile elements 18 is such that the hopper 159 is placed over the bottom of legs 1 and drive wheels 2. It will be shown that the inclination of legs 1, starting from said driving wheels 2, permits of mounting on the assembly B a hopper substantially wider than the housing of assembly B.

Finally, a driving seat, designated by the general reference 161, is formed in a usual way on a fixed platform overhanging the front part of the housing of the assembly B and of the hopper 159.

It will be understood that the driving seat 161 has usual means for remotely controlling the harvesting and threshing devices of the apparatus MB and remote control means including a group of flexible cables 162 capable of being connected and disconnected to the driving and steering members of the tractor.

In operation, the harvester-thresher machine is driven with the steerable wheels 4 positioned rearward.

Figure 7:
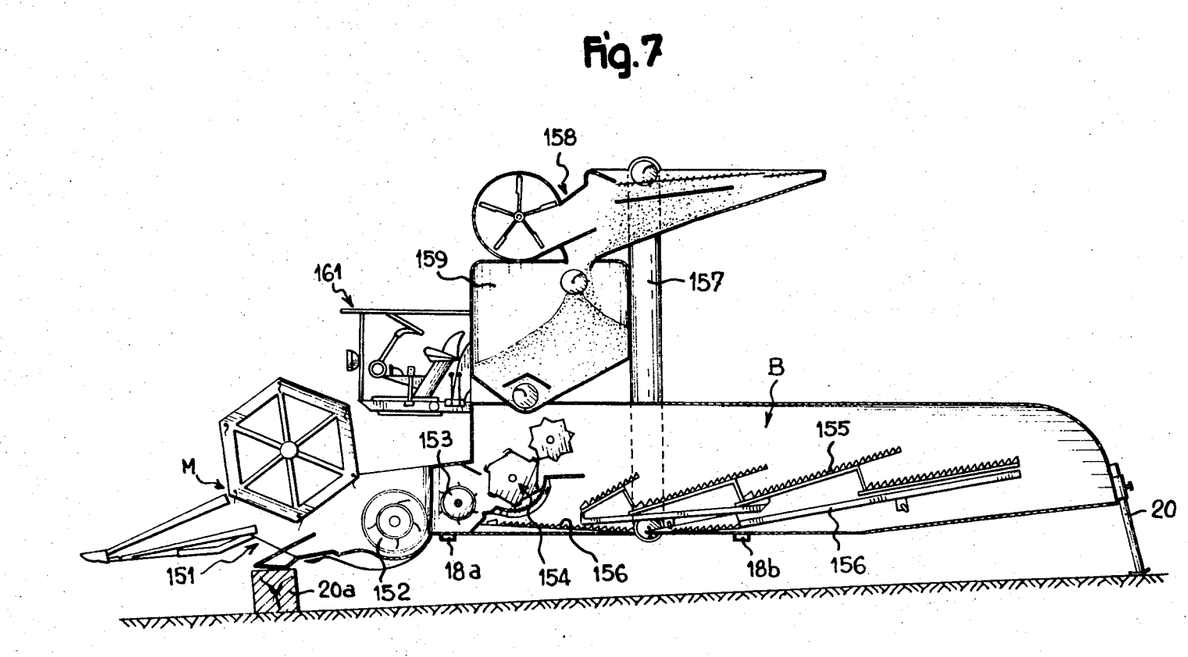
FIG. 7 shows in longitudinal and vertical section a reaping and threshing implement permitting the formation, by coupling to the tractor of FIGS. 2 to 4, of the self-propelled machine of FIG. 1.
Figure 9:
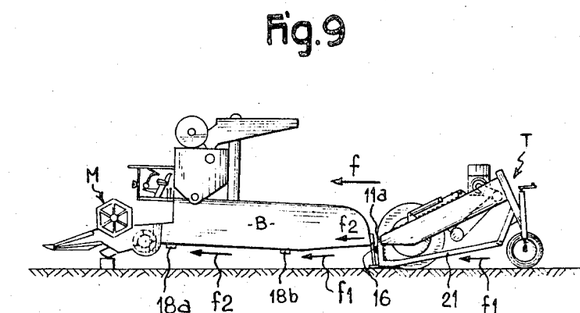
FIG. 9 is a diagram in side elevation, on a reduced scale, permitting of explaining the method of coupling the machine of FIG. 7 to the tractor of FIGS. 2 to 4.

With the arrangements described it will be apparent that the following procedure can be used for coupling the harvester-thresher implement MB to the tractor T, in order to form a self-propelled harvester-thresher. The pivoted bars 21 of the tractor are placed in their lowered position (FIGS. 2 and 9) by exhausting pressure fluid from the upper ends of cylinders 14; the implement MB is positioned a short distance away from the tractor with the prop 20 in propping position, all as shown in FIG. 7. The tractor is then driven in the direction indicated by the arrow f until the studs 16 are positioned substantially below the holes 17 of cross-bars 18a, 18b (arrows f1, f2). Pressure fluid is applied to the upper end of cylinders 14 to raise simultaneously the bars 21 about their forward pivots 22 and thereby engage studs 16 with the corresponding holes 17 in a practically simultaneous manner, prop 20 being suitably brought to its retracted position. A belt is engaged on the pulleys 51a and 160 and then the cables 162 are suitably connected to the members of the engine transmission unit. A reverse procedure would be followed for uncoupling the tractor from the implement. Such coupling and uncoupling operations can easily and quickly be performed by a single operator.

During such coupling operations, the lateral surface of the semi-oval contour of a stud 16 ensures the guiding of the edge of a hole 17 of a cross-bar 18a or 18b towards the base of said stud; this ogival contour therefore permits good longitudinal and transverse tolerances of the relative positions of the implement MB and of the tractor T.

When the tractor has been coupled to the implement as just described, it will be understood that owing to the vertically interengaging surfaces of studs 16 and holes 17 the coupled engagement will be reliably maintained by gravity. Further, owing to the vertical interengaging surfaces 16b provided at the base of the studs 16 and in the holes 17 the lateral relative positioning of the tractor side frames with respect to the implement frame will be firmly maintained, and lateral forces will be transferred therebetween. Thus, in view of the firm attachment of the two ends of bars 21 to the lower parts of the side frames of the tractor and of the rigid construction of the harvester-thresher frame, the latter will, during operation of the composite machine, participate in cross-bracing the lower parts of the side frames of the tractor.

Finally, the hinge 22 and the guiding device of the arm 11a of a bar 21 can ensure by means of said bar, suitable longitudinal bracing of the lower parts of the elements of a side frame; each side frame of the tractor frame is then of the lattice type of construction which uses relatively light elements of reduced section.

With respect to the other advantages of the method of coupling the two devices described above, it will be noted that the device which is fixed (in the example the apparatus MB) is partly straddled by the other device (the tractor); thus the surface area covered by this assembly MB can be utilized for the placing of multiple supports such as the props 20 or chocks 20a, so as to ensure suitable stability and as a result suitable safety of the apparatus MB during relative displacements of the tractor.

Another advantageous possibility afforded by the improved tractor construction, which is made possible essentially owing to the inclined side-frame legs 1, the positioning of the engine unit close to the elevated upper cross-bar 101 interconnecting the side frames, and the large clearance that is consequently present between the side frames vertically above the drive wheels 2, is to mount a large and heavyweight machine component, such as a storage bin or hopper (e.g. 159, FIG. 1) in said free space made available between the side frames above the drive wheels. This clearly improves the overall balance of the composite machine and improves the grip of the drive wheels 2 with the ground surface.

Further, because of such an improved tractor construction, the platform comprising the longitudinal bars 104 and bearing the engine unit 7 is practically situated at the level of the ceiling of the housing of the assembly B and beneath the upper part of said hopper 159 (FIG. 1); the legs 1 and 6 therefore are of length as reduced as is permitted by the height of said housing B which houses the shakers 155.

Furthermore, in contrast with the usual arrangement of the grain cleaner under the floor of a harvester-thresher, the grain cleaner 158, which is a relatively light device but of large size, is situated above the housing of the assembly B. Such an arrangement permits the formation or a corridor for the straw shakers 155 which corridor is of relatively small height; it is therefore possible to provide side frames of the tractor which are of relatively small height since only this part of the assembly B is straddled by the cross-bars 102, 103 of the upper platform of the tractor.

Finally, it will be understood that thanks to the lattice type construction of the tractor side frames and also to the relatively small dimensions of these side frames, it is possible to devise a tractor frame which is light but rigid and consequently relatively inexpensive.

The bar arrangements on the one hand, and the rigid implement frame on the other, described with reference to any of the foregoing figures have an important additional function in that they may serve as a convenient means of adjusting the elevation of the implement hitched to the tractor with respect to the ground, for example, adjusting the elevation of the cutting device 151 and harvesting platform in a harvester-thresher machine. The hinges 22 of the two bars 21 on arms 12a constitute a transverse pivoting axis for the self-propelled machine which permits utilization of an apparatus MB having a rigid frame. That is, the arcuate length of the guiding arms such as 11a and the angular range of movement of the bar 21 are preferably provided great enough to accommodate both a range of coupling displacements and a range of elevation-adjusting displacements of said bar. In a lower range of angular displacements the bar would be movable between its unhitching and hitching positions, while the upper range of angular bar displacements would serve to adjust the vertical position of the implement for working purposes. A retractable stop (not shown) is preferably provided for separating the two ranges. The devices M and B of this implement are similar to those of self-propelling machines generally used, but in the latter the harvesting assembly M (devices 151, 152, 153) includes costly hinging on to the housing of the assembly B. The device MB, with a rigid frame, avoids such hinges.

Further, such hinges 22 and such a rigid implement frame MB perlits of utilizing for driving the straw, a simple drum 153 which does away with the relatively long endless belt of usual harvesters and thereby reduces the length of the implement MB.

Figure 10:
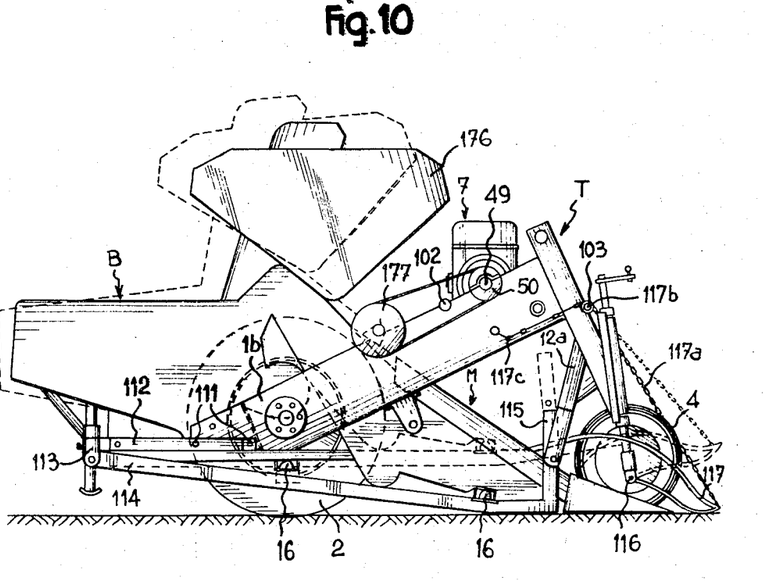
FIG. 10 shows in side elevation an alternative form of embodiment of the self-propelled machine of FIG. 1, and FIGS. 11 and 12 show respectively in plan and in longitudinal and vertical section, an implement intended to be coupled to the tractor of FIGS. 2 to 4 to form the self-propelled machine of FIG. 10.

Moreover, FIG. 10 shows a corn picker resulting from the incorporation to a tractor T of a harvesting device including a corn-reaping section M and a grain removal section B.

The tractor T includes a frame, an engine transmission unit and wheels identical to those of the tractor shown in FIGS. 2 to 4 and the references of said figures are applied to the corresponding elements of this tractor.

However, the flanges 1a, 1b of the stirrup piece of leg 1 each have two holes 111 aligned longitudinally.

The forward end of a tubular bar 112 having holes corresponding to holes 111 is fixed overhung in this stirrup piece thanks to plugs engaged in holes 111 and in those of the bar 112. The rear part of bar 112 has two lateral tabs 113 extending downwardly, each of which has a hole in order to form a stirrup piece similar to the stirrup piece of the lower end of arm 12a.

A tubular bar 114, having a cross-section similar to that of bar 22 (FIG. 2) and a length corresponding to the spacing between the tabs 113 and those of arm 12a, is hinged by its rear end, by means of a transverse hole and an appropriate plug, into the tabbed stirrup piece 113. The forward end of bar 114 is rigid with the lower part of a rectilinear arm 115. This arm has a transverse section similar to that of arm 11a and is engaged in the stirrup piece of arm 12a which forms a guide means for circular movements of bar 114 about the pivot axle 113. Finally, the bar 114 of each side frame is equipped with two studs 16, identical to studs 16 described above, and longitudinally spaced from each other.

The top end of the arm 115 is connected to hoisting means (not shown for clarification purposes) including a jack which can be secured to the lower surface of each leg 1, recall pulleys, a chain engaged over these pulleys and connected to the jack and to the upper part of arm 115 in a similar manner to that of the device 13a, 14 described above.

Finally, the bottom part of the axle journal of each steering wheel has a tab 116 having a hole. An element 117 shaped as an inclined "V", with curved branches, and formed from the shaping of a single bar, has the end of its lower branch hinged in the hole of tab 116.

The other branch of the "V" is equipped with a slightly curved rod formed of a relatively flexible material. The nose of the "V" is connected to the end of a chain 117a engaged over a pulley 117b mounted on the cross-bar 103; the other end of said chain is attached to the end of a flexible "Bowden" type cable 117c which can be actuated from a driving seat, to which reference will be made hereinafter, in order to adjust the level of the nose of the "V".

Figure 11:
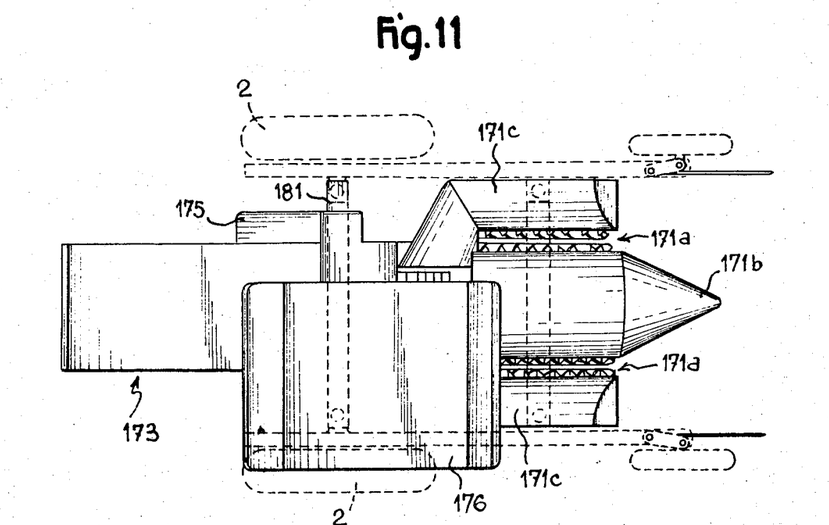
Figure 12:
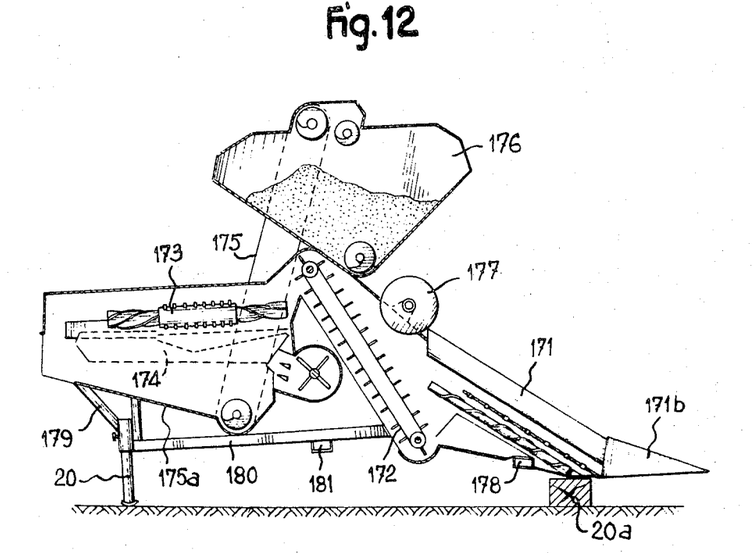

The corn picker MB, best shown in FIGS. 11 and 12, includes:
- a picking device 171 for picking two rows of corn. This device is constituted by conventional harvesting mechanisms forming two longitudinal corridors 171a, separated by a usual median divider 171b. Each harvesting corridor is limited outwardly by a wall 171c forming a deflector, and having a truncated forward part. It will be noted that this device 171 is engaged between the steerable wheels 4 of the tractor, the machine being intended to be used with the steering wheels forward, and that the forward truncated parts of walls 171 are each formed to cooperate with the rear parts of the flexible branch of the "V"-shaped element 117 associated to the corresponding steering wheel 4.
- an elevating conveyor 172 having a conventional endless belt to receive the ears of corn harvested by the picking device 171.
- a threshing assembly including a usual thresher 173 intended to be fed by the conveyor 172.
- a grain cleaner 174 having a grid and a ventilator, positioned in a usual manner, beneath the thresher 173 so as to be fed by the latter.
- a conventional grain elevator 175 associated to a base 175a for receiving the grains, positioned beneath the cleaner 174.
- a hopper 176 intended to be supplied by the elevator 175 and including usual emptying means (not referenced).

It will be understood that the devices referenced above include conventional mechanisms intended to be actioned in synchronism by conventional transmission systems, not shown. These systems comprise pulleys and belts enabling them to be actuated from a pulley 177 having a transverse axle and being aligned, when the tractor is in the coupled position, with the pulley 50 of the shaft 49 of the engine transmission unit 7 of the tractor.

The mechanical components of the device 171 are formed, in a conventional manner, on a frame reinforced by a cross-member 178; this cross-member 178 is similar to cross-member 18a of the harvester-thresher MB described above, and has at its ends two holes identical to holes 17, for the engagement of stud 16.

This frame of device 171 is rigidly secured to the conventional frame of device 172, which is strong enough to support the hopper 176. Further, it is rigid with the usual frames bearing the thresher 173 and grain cleaner 174.

In this way, the implement frame forms a rigid assembly which is reinforced at its base by a reinforcement including struts 179 and two profile elements 180, forming a stringer, which are braced between each other by a cross-member 181 identical to cross-member 178. Finally, this frame is equipped with a retractable prop 20 which, with chocks 20a, supports the frame in the uncoupled position.

It will be noted
that the longitudinal spacing between the studs 16 of each bar 114 of the tractor is equal to the spacing between the two cross-members 178 and 181,
that the length common to these cross-members 178, 181 is approximately equal to the transverse spacing between the two bars 114 of the two side frames of the tractor and that the transverse and longitudinal spacings formed between the holes 17 of cross-members 178, 181 are equal to the corresponding spacings of the studs 16 on the two bars 114.

It will be understood (FIG. 10) that the position of the cross-members 178, 181 in relation to the harvesting and threshing implement MB is such that the machine shown in this figure can operate with its steering wheels forward and that the platform formed by the cross-members 102, 103 is positioned above the picking device 171 whereas the hopper 176 is placed practically straight over the lower parts of legs 1 equipped with drive wheels 2.

Finally it will be shown that a driving seat, not shown for clarification purposes, is disposed on the left side of the implement MB; this driving seat has usual means for controlling the devices of the implement and a group of flexible cables, identical to cables 162 (FIG. 1), connects the other control members of the driving seat to the steering members of the tractor and to the engine transmission unit 7.

It is understood that coupling operations, identical to those described above, permit the formation from the implement of FIG. 12 and the tractor, of a self-propelled machine for harvesting corn.

In the same way, uncoupling operations, similar to those described above, permit of freeing this tractor from its implement with a view to coupling it to other usual machines or devices, or for other usual utilization such as those requiring a trailing configuration.

It will be specified that the tractor frame can be equipped with means for securing thereto a driving seat capable of being connected by flexible calbes to the engine transmission unit and to the steering members of the tractor, for conventional modes of utilization of the latter.

In this respect, it is possible to utilize a removable driving seat such as that described in U.S. application Ser. No. 884,523 dated 12,12,1969, in the name of the applicant.

Similarly, this coupling mode and the rigidity of the frame of the implement of FIG. 12 permit adjustment of the height of the picking device similar to the adjustment of the cutting height of the reaping device described above.

Finally, all the advantages which have been described in connection with this harvester-thresher can obviously be applied to this corn-picking machine.

In particular, although this corn picking machine is used with the steering wheels forward, the load of the hopper 176 is applied for the most part practically over the driving wheels 2, to give a suitable load distribution over the four wheels of the tractor.

Such a method of utilization with the steering wheels forward is substantially more convenient and better adapted for harvesting crops planted in rows, than conventional machines which can be used with the driving wheels forward, for these crops have passages along which the wheels of the machine can pass, and it is understood that the elements 117 constitute effective dividers associated to the pivoting movements of the steering wheels and so facilitate the corn harvesting.

Finally, it will be understood that to the abovedescribed tractor could be coupled other harvesting implements including devices and a hopper adapted in a conventional manner to the nature of the products to be harvested, and mounted on a rigid frame, the hopper being positioned over certain of these devices and the position of the coupling means on the frame ensuring a positioning of the hopper over the driving wheels such that the hopper is at least partially raised above the level of the platform carrying the engine transmission unit 7. For such a machine, the hinging of the coupling bars likewise ensures the adjustment of the working level of the harvesting device of this machine.

It goes without saying that many changes and substitutions of parts may be made to the specific forms of embodiment hereinbefore described without departing from the spirit and scope of the invention.

What is claimed is:

1. A self-propelled tractor adapted to be incorporated with a harvesting apparatus in order to form therewith a self-propelled harvesting machine, said tractor including a pair of vertically extending transversely spaced side frames, each side frame including a forward inclined element and a rearward inclined element; said elements being fixedly connected at their upper ends to form a reversed V-shape; said forward inclined element having greater inclination than that of said rearward inclined element with respect to a vertical axis; a drive wheel mounted adjacent the lower end of said forward inclined element and a steering wheel mounted adjacent the lower end of said rearward inclined element; said tractor further including transverse bracing means having their opposite extremities connected to the upper end of said reversed V-shaped elements to maintain said side frame in spaced relationship and to form between said side frames and beneath said transverse bracing means a free space for receiving therein at least a part of said harvesting apparatus; an engine transmission unit transversely supported on said transverse bracing means above said free space; means for transmitting the power of said engine transmission unit to said drive wheels; each of said side frames further including a longitudinally extending bar having one extremity pivotally mounted to one of said inclined elements and having secured at the other extremity thereof a guide arm disposed in the plane of said side frame and being movably mounted relative to the other of said inclined elements of said side frame; means mounted on one of said side frames for raising and lowering said longitudinally extending bars to facilitate the incorporation of said harvesting apparatus on said side frames; and coupling means mounted on said bars including surfaces vertically engageable with corresponding surfaces provided on the frame of the harvesting apparatus to provide a coupled engagement between the tractor and the frame of the harvesting apparatus within said free space between said inclined elements whereby said harvesting apparatus is directly supported by said tractor.

2. A tractor as defined in claim 1 wherein said transverse bracing means include at least three parallel bars mounted transversely by their ends on the inclined elements of each side frame, one bar being placed above a plane formed by at least two other bars.

3. A tractor as defined in claim 1 further comprising a displaceable driving seat equipped with means for driving and steering the tractor and remote control means including a group of flexible cables connected to the driving and steering means of the tractor; said seat being adapted to be mounted at different locations on said tractor and said harvesting apparatus.

4. A tractor as defined in claim 1 wherein said guide arm is of a rectangular cross-section and is shaped as an arc of a circumference having its center at the pivotal point of said longitudinally extending bar with its associated inclined element, the lower extremity of said one of said inclined elements consisting of two walls parallel to each other and partially braced by a slightly curved plate frictionally engaging said guide arm whereby said arm is guided between said walls when said bar is vertically moved.

5. A tractor as defined in claim 4 wherein said means for raising and lowering said longitudinally extending bars include a chain engaged on recall pulleys rigid with a transversal axle and on guiding pulleys mounted free on axles respectively mounted on the side walls of the lower extremity of said one of said inclined elements, one end of said chain being connected to one longitudinally extending bar and the other end being connected to hydraulic means for operating said chain.

6. A self-propelled harvesting machine resulting from the coupling of harvesting apparatus to a self-propelled tractor, said tractor comprising: a pair of vertically extending transversely spaced side frames, each side frame including a forward inclined element and a rearward inclined element; said elements being fixedly connected at their upper ends to form a reversed V-shape; said forward inclined element having greater inclination than that of said rearward inclined element with respect to a vertical axis; a drive wheel mounted adjacent the lower end of said forward inclined element and a steering wheel mounted adjacent the lower end of said rearward inclined element; said tractor further including transverse bracing means having their opposite extremities connected to the upper end of said reversed V-shaped elements to maintain said side frame in spaced relationship and to form between said side frames and beneath said transverse bracing means a free space for receiving therein at least a part of said harvesting apparatus; an engine transmission unit transversely supported on said transverse bracing means above said free space; means for transmitting the power of said engine transmission unit to said drive wheels; each of said side frames further including a longitudinally extending bar having one extremity pivotally mounted to one of said inclined elements and having secured at the other extremity thereof a guide arm disposed in the plane of said side frame and being movably mounted relative to the other of said inclined elements of said side frame; means mounted on one of said side frames for raising and lowering said longitudinally extending bars to facilitate the incorporation of said harvesting apparatus on said side frames; and coupling means mounted on said bars including surfaces vertically engageable with corresponding surfaces provided on the frame of the harvesting apparatus to provide a coupled engagement between the tractor and the frame of the harvesting apparatus within said free space between said inclined elements whereby said harvesting apparatus is directly supported by said tractor; said harvesting apparatus including a rigid frame equipped with coupling elements having surfaces vertically engageable with the vertically engageable surfaces of the coupling means of said tractor, a harvesting device rigidly mounted on a front part of said frame, devices for separating, transferring, cleaning and conveying the product harvested, said devices being mounted in series on said frame and ensuring circulation of the product harvested, a hopper mounted on the frame and extending upwardly, at least partially above said separation and cleaning device said hopper being supplied by means of one of the conveyor devices with the product delivered by the cleaning device, a conventional transmission system for actuating said harvesting separation, transfer, cleaning and conveying devices.

7. A harvesting machine as defined in claim 6 wherein said harvesting apparatus includes transmission means consisting of a pulley and of a belt and wherein said engine transmission unit includes a belt operatively connected to said pulley of said harvesting apparatus; said pulleys having their respective shafts coplanar with the pivot axis of said pivotally mounted longitudinally extending bar.

* * * * *